US011632055B2

(12) United States Patent
Wang et al.

(10) Patent No.: US 11,632,055 B2
(45) Date of Patent: Apr. 18, 2023

(54) ACF CONVERTER, VOLTAGE CONVERSION METHOD, AND ELECTRONIC DEVICE

(71) Applicant: Huawei Digital Power Technologies Co., Ltd., Shenzhen (CN)

(72) Inventors: Qinglei Wang, Dongguan (CN); Qinghui Hou, Dongguan (CN); Chenghao Sun, Dongguan (CN); Wei Liu, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 133 days.

(21) Appl. No.: 17/359,135

(22) Filed: Jun. 25, 2021

(65) Prior Publication Data

US 2021/0328520 A1    Oct. 21, 2021

Related U.S. Application Data

(63) Continuation of application No. PCT/CN2019/118173, filed on Nov. 13, 2019.

(30) Foreign Application Priority Data

Dec. 26, 2018 (CN) .......................... 201811600788.4

(51) Int. Cl.
*H02M 3/335* (2006.01)
*H02M 1/00* (2006.01)

(52) U.S. Cl.
CPC ..... *H02M 3/33592* (2013.01); *H02M 1/0058* (2021.05)

(58) Field of Classification Search
None
See application file for complete search history.

(56) References Cited

U.S. PATENT DOCUMENTS 9,991,811 B1    6/2018  Song et al.
10,291,141 B1*  5/2019  Xue .................... H02M 1/083
(Continued)

FOREIGN PATENT DOCUMENTS

CN    1447505 A    10/2003
CN  103795260 A     5/2014
(Continued)

OTHER PUBLICATIONS

Zhang et al., "A High Efficiency Flyback Converter With New Active Clamp Technique," IEEE Transactions on Power Electronics, vol. 25, No. 7, pp. 1775-1785 (Jul. 2010).

*Primary Examiner* — Jeffrey A Gblende
(74) *Attorney, Agent, or Firm* — Leydig, Voit & Mayer, Ltd.

(57) ABSTRACT

An Active Clamp Flyback (ACF) converter includes a transformer module, a clamping module, and a controller. The controller is configured to: after the transformer module starts secondary side discharging, control the clamping module to start receiving leakage inductance power from the transformer module; and after controlling the clamping module to stop receiving the leakage inductance power from the transformer module, control the clamping module to release the leakage inductance power to the transformer module. The leakage inductance power released by the clamping module to the transformer module is used by the transformer module to restore a soft switching state based on the leakage inductance power. In a process of transferring the leakage inductance power to a clamping capacitor, the clamping module is in an enabled state. This reduces a loss caused by the clamping module to the leakage inductance power, and helps reduce overall loss caused by the ACF converter.

17 Claims, 6 Drawing Sheets

(56) References Cited

U.S. PATENT DOCUMENTS

| | | | |
|---|---|---|---|
| 10,333,417 B2* | 6/2019 | Song | H02M 3/33592 |
| 10,411,603 B1* | 9/2019 | Strijker | H02M 3/33507 |
| 2017/0264206 A1 | 9/2017 | Rana et al. | |
| 2018/0254710 A1 | 9/2018 | Wang et al. | |
| 2018/0287481 A1 | 10/2018 | LIU et al. | |
| 2018/0301975 A1 | 10/2018 | Lin et al. | |
| 2019/0013739 A1* | 1/2019 | Hari | H02M 3/33515 |
| 2019/0036446 A1 | 1/2019 | Yang et al. | |

FOREIGN PATENT DOCUMENTS

| | | |
|---|---|---|
| CN | 106712472 A | 5/2017 |
| CN | 107181410 A | 9/2017 |
| CN | 107453610 A | 12/2017 |
| CN | 108736730 A | 11/2018 |
| CN | 108988652 A | 12/2018 |
| CN | 109639149 A | 4/2019 |

* cited by examiner

ACF CONVERTER, VOLTAGE CONVERSION METHOD, AND ELECTRONIC DEVICE

CROSS-REFERENCE TO RELATED APPLICATIONS

This application is a continuation of International Application No. PCT/CN2019/118173, filed on Nov. 13, 2019, which claims priority to Chinese Patent Application No. 201811600788.4, filed on Dec. 26, 2018. The disclosures of the aforementioned applications are hereby incorporated by reference in their entireties.

TECHNICAL FIELD

Embodiments of the present disclosure relate to the field of electronic science and technologies, and in particular, to an Active Clamp Flyback (ACF) converter, a voltage conversion method, and an electronic device.

BACKGROUND

An active clamp flyback (ACF) converter is a power converter with a relatively small switching loss, and can perform voltage conversion on a received input voltage, to change a voltage value of the input voltage, and output the voltage as an output voltage.

The ACF converter usually includes a controller and an ACF circuit. The ACF circuit mainly includes a transformer module and a clamping module. The transformer module is mainly configured to perform voltage conversion on the received input voltage under control of the controller. The clamping module is mainly configured to: receive and store leakage inductance power from the transformer module under control of the controller, and perform reverse charging on the transformer module by using the stored leakage inductance power after the transformer module completes voltage conversion on the input voltage, so that a main switching transistor in the transformer module enters a zero voltage switching (ZVS) state, to reduce a switching loss when the main switch is turned on next time.

However, when the clamping module receives and stores the leakage inductance power from the transformer module, there is usually a specific loss to the received leakage inductance power. This is not conducive to improving overall energy utilization of the ACF converter.

SUMMARY

Embodiments of this application provide an ACF converter, a voltage conversion method, and an electronic device, to reduce a loss caused by the ACF converter.

According to a first aspect, an embodiment of this application provides an ACF converter. The ACF converter includes a transformer module, a clamping module, and a first controller. The first controller is configured to: after the transformer module starts secondary side discharging, control the clamping module to start receiving leakage inductance power from the transformer module. The first controller is further configured to: after controlling the clamping module to stop receiving the leakage inductance power from the transformer module, control the clamping module to release the leakage inductance power to the transformer module. The leakage inductance power released by the clamping module to the transformer module is used by the transformer module to restore a soft switching state based on the leakage inductance power.

In the foregoing method, after the transformer module starts the secondary side discharging, the controller may enable the clamping module, so that the leakage inductance power in the transformer module may be transferred and stored in the clamping module by using a path including the enabled clamping module. In comparison with a control mode in which after the transformer module starts the secondary side discharging, the leakage inductance is transferred by using a parasitic diode in the clamping module, and the clamping module is enabled only once to release the stored leakage inductance to the transformer module, in this embodiment of this application, the clamping module is enabled for one more time in a process in which the leakage inductance power in the transformer module is transferred to the clamping module, and the enabled clamping module has smaller impedance than the parasitic diode. Therefore, this reduces a loss caused by the clamping module to the leakage inductance power, and reduces an overall loss caused by the ACF converter.

According to the first aspect, in a possible implementation, the ACF converter further includes a first power supply terminal and a second power supply terminal. The first power supply terminal and the second power supply terminal are configured to connect to an electrode of a power supply circuit, the transformer module includes a main switching transistor and a transformer, a first electrode of the main switching transistor is connected to the first power supply terminal, a second electrode is connected to one end of a primary side of the transformer, a gate electrode is connected to the first controller, and the other end of the primary side of the transformer is connected to the second power supply terminal. When controlling the clamping module to release the leakage inductance power to the transformer module, the first controller is specifically configured to: after duration for which the clamping module is controlled to release the leakage inductance power to the transformer module reaches first duration, control the clamping module to stop releasing the leakage inductance power. The first controller is further configured to: obtain a voltage difference between a voltage of the first electrode and a voltage of the second electrode, and adjust the first duration based on the voltage difference.

According to the first aspect, in a possible implementation, when adjusting the first duration based on the voltage difference, the first controller is specifically configured to: shorten the first duration if the voltage difference is less than a second preset threshold; and/or extend the first duration if the voltage difference is greater than the second preset threshold.

Different main switching transistors usually have different parasitic capacitors, so that different quantities of charges remain between a first electrode and a second electrode when the different main switching transistors are cut off. In addition, even when a load size of a same main switching transistor changes, a quantity of charges remaining between a first electrode and a second electrode when the main switching transistor is cut off also changes. In this embodiment of this application, the controller may adjust the first duration based on the voltage difference between the first electrode and the second electrode of the main switching transistor, to adapt to different main switching transistors and a change in the load size, so that the main switching transistor can enter a relatively good soft switching state before being turned on each time.

According to the first aspect, in a possible implementation, before the transformer module starts the secondary side discharging, the first controller is further configured to:

control the transformer module to start primary side charging, and after duration of the primary side charging reaches second duration, control the transformer module to stop the primary side charging and to start the secondary side discharging; and the first controller is further configured to: adjust the second duration based on the voltage difference.

According to the first aspect, in a possible implementation, when adjusting the second duration based on the voltage difference, the first controller is specifically configured to: shorten the second duration if the voltage difference is reduced to a value less than a first preset threshold within third duration after the clamping module is controlled to stop releasing the leakage inductance power; and/or extend the second duration if the voltage difference is not reduced to the value less than the first preset threshold within the third duration after the clamping module is controlled to stop releasing the leakage inductance power.

If the voltage difference is reduced to the value less than the first preset threshold within the third duration after the clamping module is controlled to stop releasing the leakage inductance power, it indicates that the transformer module is excessively charged in a current period, and consequently, the leakage inductance power is excessive. Further, the clamping module reversely excessively charges the transformer module, and the main switching transistor enters the soft switching state relatively quickly. Therefore, time to charge the transformer module in a next period needs to be shortened; or if the voltage difference is not reduced to the value less than the first preset threshold within the third duration after the clamping module is controlled to stop releasing the leakage inductance power, the time to charge the transformer module in the next period needs to be extended. In this way, cycle duration is adjusted.

According to the first aspect, in a possible implementation, when controlling the clamping module to start receiving the leakage inductance power from the transformer module, the first controller is specifically configured to: after duration for which the transformer module stops the primary side charging and starts the secondary side discharging reaches fourth duration, control the clamping module to start receiving the leakage inductance power from the transformer module, where the fourth duration is not less than a switching delay of the main switching transistor.

According to the first aspect, in a possible implementation, after controlling the clamping module to start receiving the leakage inductance power from the transformer module, the first controller is further configured to: after duration for which the clamping module starts receiving the leakage inductance power from the transformer module reaches fifth duration, control the clamping module to stop receiving the leakage inductance power from the transformer module, where the fifth duration is determined based on a clamping current flowing through the clamping module.

According to the first aspect, in a possible implementation, the ACF converter further includes a rectification module, one end of the rectification module is connected to the second electrode of the main switching transistor, and the other end is connected to a load circuit; and the rectification module is configured to control a direction of an output current of the transformer module.

According to the first aspect, in a possible implementation, the ACF converter further includes a second controller, and the rectification module includes a secondary side transistor; a first electrode of the secondary side transistor is connected to a secondary side of the transformer, a second electrode is connected to a first output terminal or a second output terminal, and a control electrode is connected to the second controller; and the second controller is separately connected to the first electrode and the second electrode of the secondary side transistor, and is configured to: obtain a voltage of the first electrode and a voltage of the second electrode of the secondary side transistor, and conduct the first electrode and the second electrode of the secondary side transistor when the voltage of the first electrode and the voltage of the second electrode meet a preset forward relationship, where the forward relationship is a relative value relationship between a voltage value of the first electrode and a voltage value of the second electrode when the transformer module starts the secondary side discharging and power released by the transformer module flows between the first electrode and the second electrode.

According to a second aspect, an embodiment of this application provides a voltage conversion method performed by an ACF converter. The ACF converter includes a transformer module, a clamping module, and a first controller, and the method is applied to the first controller and includes: after the transformer module starts secondary side discharging, controlling the clamping module to start receiving leakage inductance power from the transformer module; and after controlling the clamping module to stop receiving the leakage inductance power from the transformer module, controlling the clamping module to release the leakage inductance power to the transformer module, where the leakage inductance power released by the clamping module to the transformer module is used by the transformer module to restore a soft switching state based on the leakage inductance power.

According to the second aspect, in a possible implementation, the ACF converter further includes a first power supply terminal and a second power supply terminal, the first power supply terminal and the second power supply terminal are configured to connect to an electrode of a power supply circuit, the transformer module includes a main switching transistor and a transformer, a first electrode of the main switching transistor is connected to the first power supply terminal, a second electrode is connected to one end of a primary side of the transformer, a gate electrode is connected to the first controller, and the other end of the primary side of the transformer is connected to the second power supply terminal; the controlling the clamping module to release the leakage inductance power to the transformer module includes: after duration for which the clamping module is controlled to release the leakage inductance power to the transformer module reaches first duration, controlling the clamping module to stop releasing the leakage inductance power; and the method further includes: obtaining a voltage difference between a voltage of the first electrode and a voltage of the second electrode, and adjusting the first duration based on the voltage difference.

According to the second aspect, in a possible implementation, the adjusting the first duration based on the voltage difference includes: shortening the first duration if the voltage difference is less than a second preset threshold; and/or extending the first duration if the voltage difference is greater than the second preset threshold.

According to the second aspect, in a possible implementation, before the transformer module starts the secondary side discharging, the method further includes: controlling the transformer module to start primary side charging, and after duration of the primary side charging reaches second duration, controlling the transformer module to stop the primary side charging and to start the secondary side discharging; and the method further includes: adjusting the second duration based on the voltage difference.

According to the second aspect, in a possible implementation, the adjusting the second duration based on the voltage difference includes: shortening the second duration if the voltage difference is reduced to a value less than a first preset threshold within third duration after the clamping module is controlled to stop releasing the leakage inductance power; and/or extending the second duration if the voltage difference is not reduced to the value less than the first preset threshold within the third duration after the clamping module is controlled to stop releasing the leakage inductance power.

According to the second aspect, in a possible implementation, the controlling the clamping module to start receiving leakage inductance power from the transformer module includes: after duration for which the transformer module stops the primary side charging and starts the secondary side discharging reaches fourth duration, controlling the clamping module to start receiving the leakage inductance power from the transformer module, where the fourth duration is not less than a switching delay of the main switching transistor.

According to the second aspect, in a possible implementation, after the controlling the clamping module to start receiving leakage inductance power from the transformer module, the method further includes: after duration for which the clamping module starts receiving the leakage inductance power from the transformer module reaches fifth duration, controlling the clamping module to stop receiving the leakage inductance power from the transformer module, where the fifth duration is determined based on a clamping current flowing through the clamping module.

According to the second aspect, in a possible implementation, the ACF converter further includes a rectification module, one end of the rectification module is connected to the second electrode of the main switching transistor, and the other end is connected to a load circuit; and the rectification module is configured to control a direction of an output current of the transformer module.

According to a third aspect, an embodiment of this application provides an electronic device. The electronic device includes a power supply circuit, a load circuit, and the ACF converter that is separately connected to the power supply circuit and the load circuit and that is provided in any one of the first aspect or the possible implementations of the first aspect.

DESCRIPTION OF EMBODIMENTS

The following further describes in detail the present disclosure with reference to accompanying drawings. It should be noted that "a plurality of" in descriptions of the embodiments of this application means two or more. In view of this, in the embodiments of the present disclosure, "a plurality of" may also be understood as "at least two". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects. In addition, it should be understood that in the descriptions of this application, the words such as "first" and "second" are merely used for distinction description, and shall not be understood as an indication or implication of relative importance or an indication or implication of an order.

Figure 1:
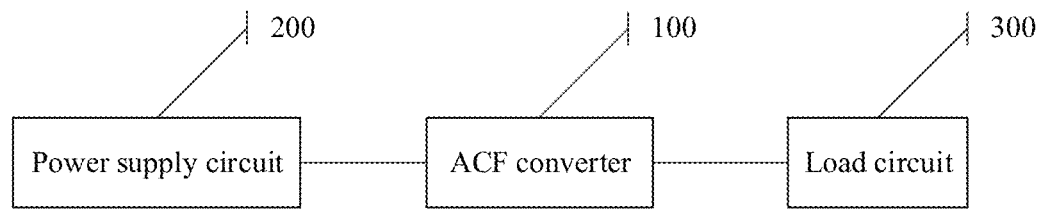
FIG. 1 is a schematic diagram of a connection relationship of an ACF converter according to an embodiment of this application.

As a power converter with a relatively small switching loss, an ACF converter has been used more widely. Usually, the ACF converter may be integrated into a terminal device in a form of a chip. FIG. 1 is a schematic diagram of a connection relationship of an ACF converter. As shown in FIG. 1, one side of an ACF converter 100 is connected to a power supply circuit 200, and the other side is connected to a load circuit 300. The power supply circuit 200 is a circuit that is in an electronic device and that provides an input voltage to the ACF converter 100. The input voltage provided by the power supply circuit 200 may come from an internal battery of the electronic device or an external power supply connected to the electronic device. This is not limited in this embodiment of this application. The load circuit 300 is an output circuit that is in the electronic device and that externally outputs the ACF converter 100. The load circuit 300 may include an internal load of the electronic device, or may be connected to an external load of the electronic device. This is not limited in this embodiment of this application.

In FIG. 1, the ACF converter 100 may receive the input voltage from the power supply circuit 200, convert the input voltage, and provide the converted input voltage to the load circuit 300 as an output voltage. It is assumed that a voltage value of the input voltage received from the power supply circuit 200 is Vi, and the ACF converter converts the voltage value of the input voltage from Vi to Vo, and provides an output voltage whose voltage value is Vo to the load circuit 300.

Figure 2:
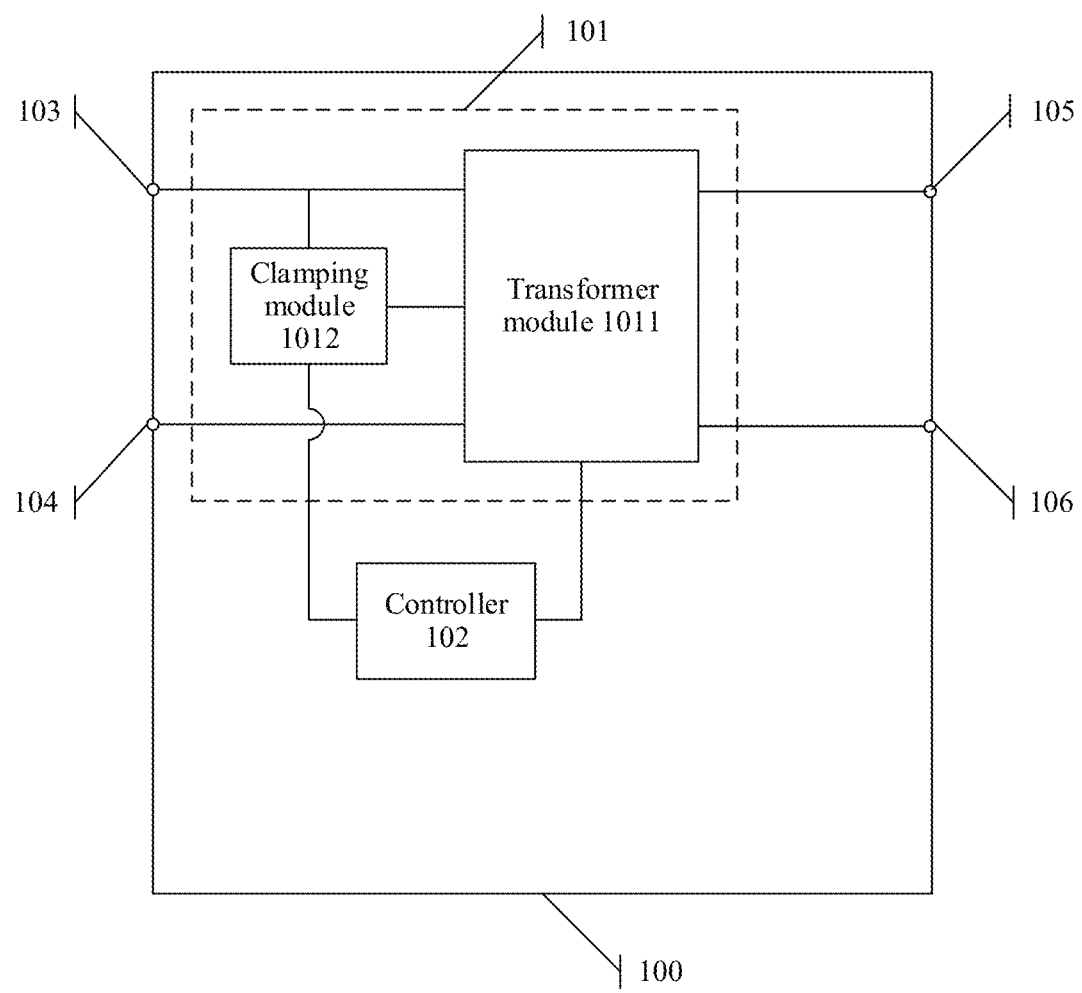
FIG. 2 is a schematic structural diagram of an ACF converter according to an embodiment of this application.

In the foregoing process, a voltage conversion function of the ACF converter 100 may be implemented based on a structure shown in FIG. 2. FIG. 2 is a schematic structural diagram of an ACF converter. As shown in FIG. 2, the ACF converter 100 includes a transformer module 1011, a clamping module 1012, and a controller 102. The controller 102 is separately connected to the transformer module 1011 and the clamping module 1012, and may separately control working states of the transformer module 1011 and the clamping module 1012 by using a control signal, to implement voltage conversion. A circuit structure to which the transformer module 1011 and the clamping module 1012 belong may be referred to as an ACF circuit 101.

In addition, the ACF converter 100 may further include a plurality of connection terminals configured to connect to the power supply circuit 200 and the load circuit 300. As shown in FIG. 2, a first power supply terminal 103 is configured to connect to a positive electrode of the power supply circuit 200, a second power supply terminal 104 is configured to connect to a negative electrode of the power supply circuit 200, a first output terminal 105 is configured to connect to a negative electrode of the load circuit 300, and a second output terminal 106 is configured to connect to a positive electrode of the load circuit 300.

It should be understood that the ACF converter 100 shown in FIG. 2 is merely a specific implementation, and another implementation of the ACF converter is not excluded in this embodiment of this application. For example, one side of the clamping module 1012 is connected to the transformer module 1011, and the other side may be connected to the first power supply terminal 103, or may be connected to the second power supply terminal 104. To simplify description, in this embodiment of this application, a connection manner shown in FIG. 2 is used as an example to describe the ACF converter 100 provided in this embodiment of this application.

Usually, the transformer module 1011 in the ACF circuit 101 includes a transformer configured to perform voltage conversion and a main switching transistor controlled by the controller 102, and the clamping module 1012 includes a clamping capacitor configured to store and release leakage inductance power and a clamping transistor controlled by the controller 102. For example, a specific structure of the ACF circuit 101 of the ACF converter 100 shown in FIG. 2 may be shown in FIG. 3.

Figure 3:
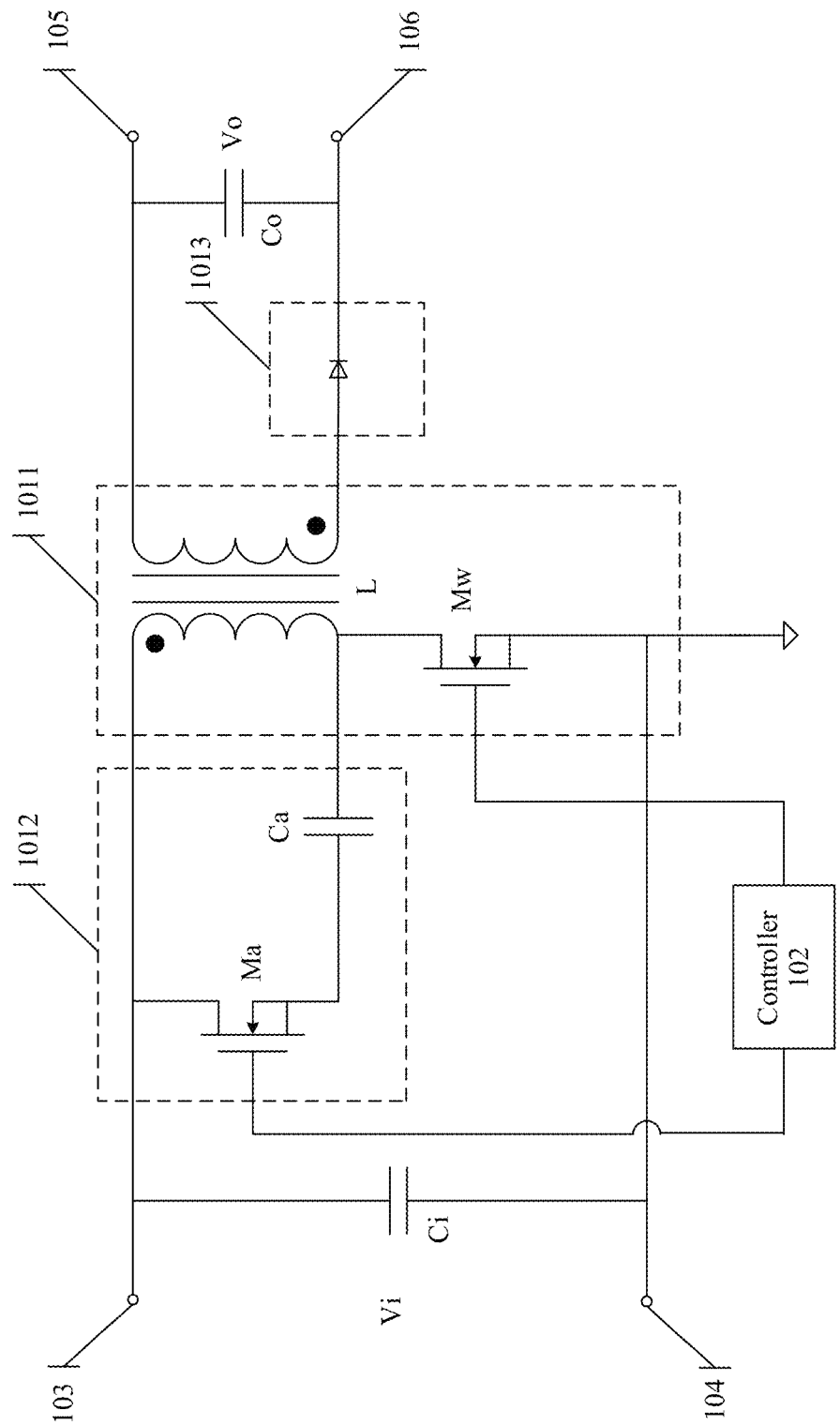
FIG. 3 is a schematic structural diagram of a specific ACF converter according to an embodiment of this application.

In FIG. 3, the transformer module 1011 includes a transformer L and a main switching transistor Mw. One end of a primary side of the transformer L is connected to the first power supply terminal 103, and the other end is connected to a first electrode of the main switching transistor Mw. A second electrode of the main switching transistor Mw is connected to the second power supply terminal 104, and a control electrode is connected to the controller 102. Both ends of a secondary side of the transformer L are respectively connected to the first output terminal 105 and the second output terminal 106.

As shown in FIG. 3, a rectification module 1013 may be further included between the secondary side of the transformer L and the second output terminal 106. The rectification module 1013 may be a rectifier diode. One end of the rectification module is connected to the transformer module 1011, and the other end is connected to the second output terminal 106 or the load circuit 300, to control a direction of an output current of the transformer module 1011. The rectifier diode 1013 is used as an example. An anode of the rectifier diode 1013 is connected to the second output terminal 106, and a cathode is connected to the secondary side of the transformer L. Usually, when the rectifier diode 1013 is conducted, the secondary side of the transformer may output power obtained through conversion from the primary side. When the rectifier diode 1013 is cut off, the secondary side of the transformer cannot output the power obtained through conversion from the primary side.

In FIG. 3, the clamping module 1012 includes a clamping transistor Ma and a clamping capacitor Ca. One end of the clamping capacitor Ca is connected to the first electrode of the main switching transistor Mw, and the other end is connected to a second electrode of the clamping transistor Ma. A first electrode of the clamping transistor Ma is connected to the end that is of the primary side of the transformer L and that is connected to the first power supply terminal 103.

In addition, as shown in FIG. 3, the ACF circuit further includes an input capacitor Ci and a load capacitor Co. A first electrode of the input capacitor Ci is connected to the first power supply terminal 103, and a second electrode is connected to the second power supply terminal 104, to filter out a voltage ripple caused by continuous conduction and cutoffs of the main switching transistor Mw. A first electrode of the load capacitor Co is connected to the first output terminal 105, and a second electrode is connected to the second output terminal 106, to store, when the main switching transistor Mw is cut off, power transferred from the primary side of the transformer L to the secondary side of the transformer, and when the main switching transistor Mw is conducted, supply power to the load circuit 300 through the second output terminal 106 and the first output terminal 105.

It should be understood that a structure of the ACF circuit shown in FIG. 3 is merely a specific and feasible example. In an implementation and application process, a circuit structure of the ACF circuit may be flexibly designed based on an application scenario. For example, the ACF circuit may include a plurality of transformers L. Secondary sides of the transformers L provide output voltages to different load circuits 300. For another example, in the clamping module 1012, the first electrode of the clamping transistor Ma may be connected to one end of the clamping capacitor Ca, the second electrode of the clamping transistor Ma is connected to the first electrode of the main switching transistor Mw, and the other end of the clamping capacitor Ca is connected to the end that is in the primary side of the transformer L and that is connected to the first power supply terminal 103. This is not limited in this application.

In this embodiment of this application, the main switching transistor Mw and the clamping transistor Ma may be power devices such as an N-channel metal oxide semiconductor (NMOS) transistor, a P-channel metal oxide semiconductor (PMOS) transistor, an insulated gate bipolar transistor (IGBT), and a bipolar junction transistor (BJT). This is not limited in this embodiment of this application.

The clamping module 1012 in the ACF circuit 101 may enable the transformer module 1011 to restore a ZVS state, namely, a soft switching state, by using leakage inductance power in the transformer module 1011. Specifically, not all magnetic induction lines of the primary side of the transformer L pass through the secondary side, and therefore, some power on the primary side cannot be transferred to the secondary side, and the power that cannot be transferred to the secondary side is leakage inductance power. In addition, a parasitic diode and a parasitic capacitor exist in the main switching transistor Mw. The parasitic capacitor still stores a specific quantity of charges after the first electrode and the second electrode of the main switching transistor Mw are cut off, so that a specific voltage difference still exists between the two electrodes. In the ACF circuit 101, the clamping module 1012 may store the leakage inductance power from the transformer L, and use the stored leakage inductance power from the transformer L to make the voltage difference between the first electrode and the second electrode of the main switching transistor Mw approach to 0, to enable the main switching transistor Mw to restore the soft switching state.

Figure 4:
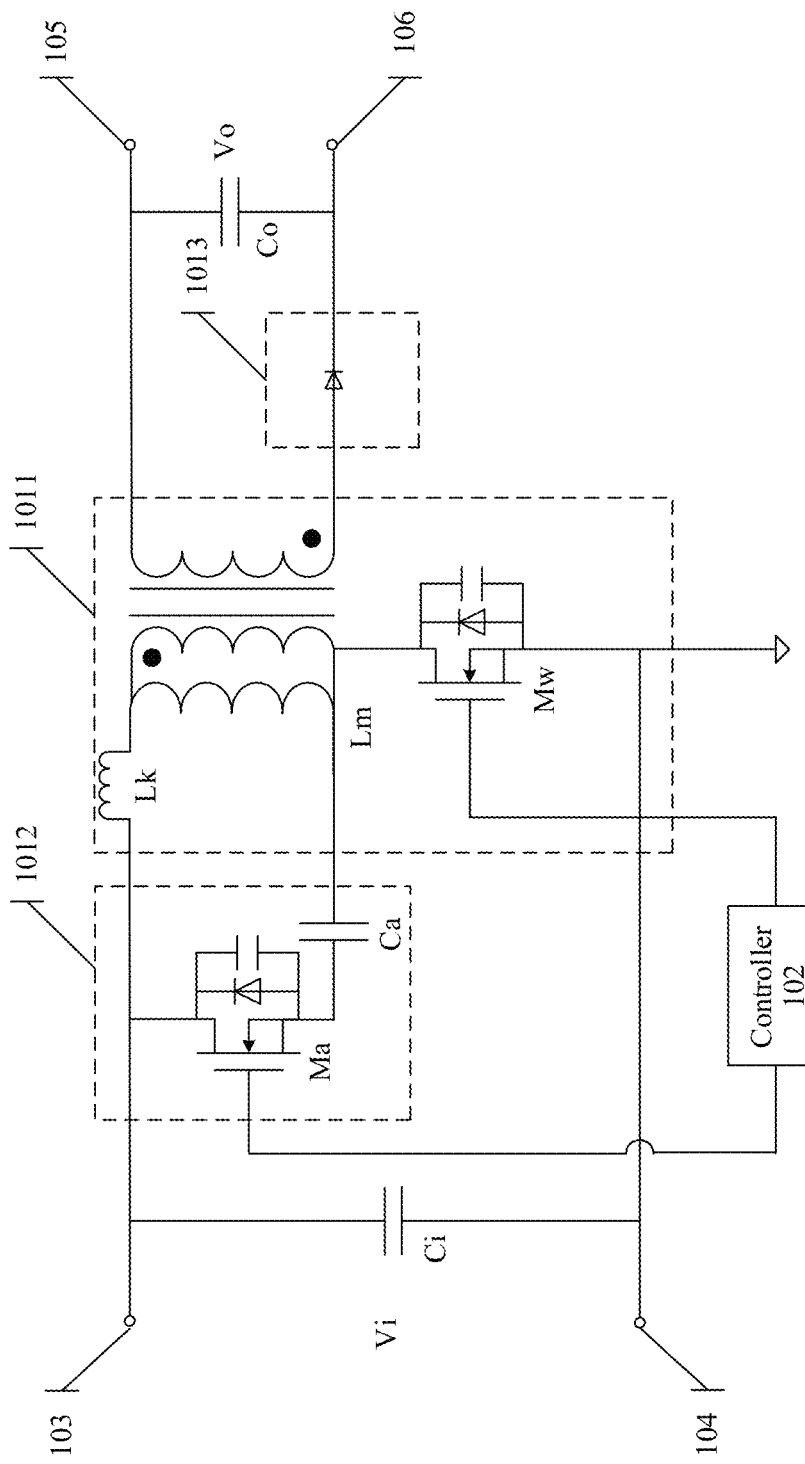
FIG. 4 shows a structure of an equivalent circuit of an ACF circuit according to an embodiment of this application.

To describe a principle of the ACF circuit more intuitively, this embodiment of this application further provides a structure of an equivalent circuit of the ACF circuit shown in FIG. 4. Lm is an equivalent excitation inductor of the primary side of the transformer L. The excitation inductor Lm may store power when the primary side of the transformer L is charged, and convert all the stored power to the secondary side of the transformer L when the primary side of the transformer L discharges power. Lk is an equivalent leakage inductor of the primary side of the transformer L. The leakage inductor Lk may store power when the primary side of the transformer L is charged, but cannot convert the stored power to the secondary side of the transformer L when the primary side of the transformer L discharges power.

As shown in FIG. 4, a parasitic diode and a parasitic capacitor are connected in parallel to an equivalent first electrode and an equivalent second electrode of the main switching transistor Mw, and similarly, a parasitic diode and a parasitic capacitor are also connected in parallel to an equivalent first electrode and an equivalent second electrode of the clamping transistor Ma.

In this embodiment of this application, the controller 102 is configured to: after the transformer module 1011 starts the secondary side discharging, control the clamping module 1012 to start receiving the leakage inductance power from the transformer module 1011; and after the clamping module 1012 is controlled to stop receiving the leakage inductance power from the transformer module 1011, control the clamping module 1012 to release the leakage inductance power to the transformer module 1011. The leakage inductance power released by the clamping module 1011 to the transformer module 1012 is used by the transformer module 1011 to restore the soft switching state based on the leakage inductance power.

FIG. 4 is used as an example. After the transformer module 1011 starts the secondary side discharging, the excitation inductor Lm of the primary side of the transformer in the transformer module 1011 discharges power to the secondary side of the transformer. The controller 102 enables the clamping transistor Ma, so that leakage inductance power in the leakage inductor Lk can be transferred to the clamping capacitor Ca and stored by the clamping capacitor Ca. The clamping transistor Ma is in an enabled state in a process of transferring the leakage inductance power to the clamping capacitor Ca. In comparison with a control mode in which the leakage inductance power is transferred by using the parasitic diode of the clamping transistor Ma, in this embodiment of this application, the enabled clamping transistor Ma has smaller impedance than the parasitic diode. Therefore, a loss caused to the leakage inductance power is smaller. It can be learned that a mode in which the controller 102 controls the ACF circuit 101 in this embodiment of this application helps reduce a loss caused by the clamping transistor Ma to the leakage inductance power, thereby helping reduce an overall loss caused by the ACF converter.

Usually, the controller 102 may control a cutoff or conduction of the main switching transistor Mw and the clamping transistor Ma by using a control signal, to control the transformer module 1011 and the clamping module 1012. A voltage conversion process is used as an example below in this embodiment of this application to describe the ACF converter provided in this embodiment of this application. It is assumed that both the main switching transistor Mw and the clamping transistor Ma are NMOS transistors that are cut off at a low voltage and conducted at a high voltage. The control signal provided by the controller 102 may be shown in FIG. 5. Sw is a control signal provided by the controller 102 to the control electrode of the main switching crystal Mw, and Sa is a control signal provided by the controller 102 to a control electrode of the clamping transistor Ma.

Figure 5:
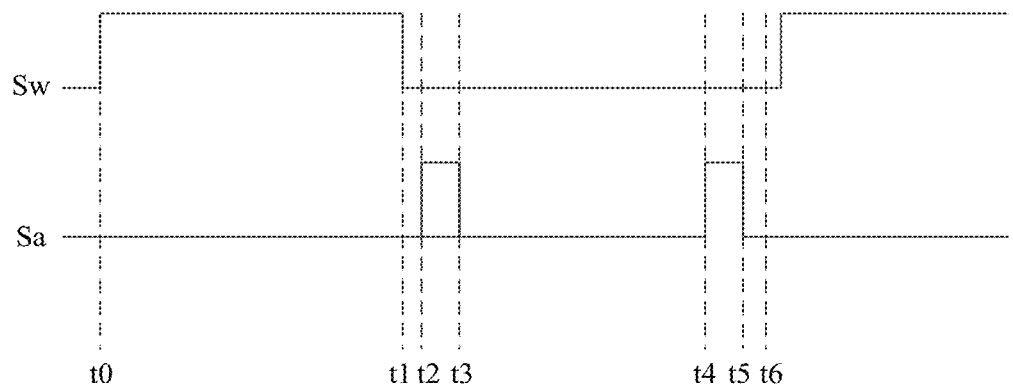
FIG. 5 is a schematic diagram of a control signal according to an embodiment of this application.
Figure 6:
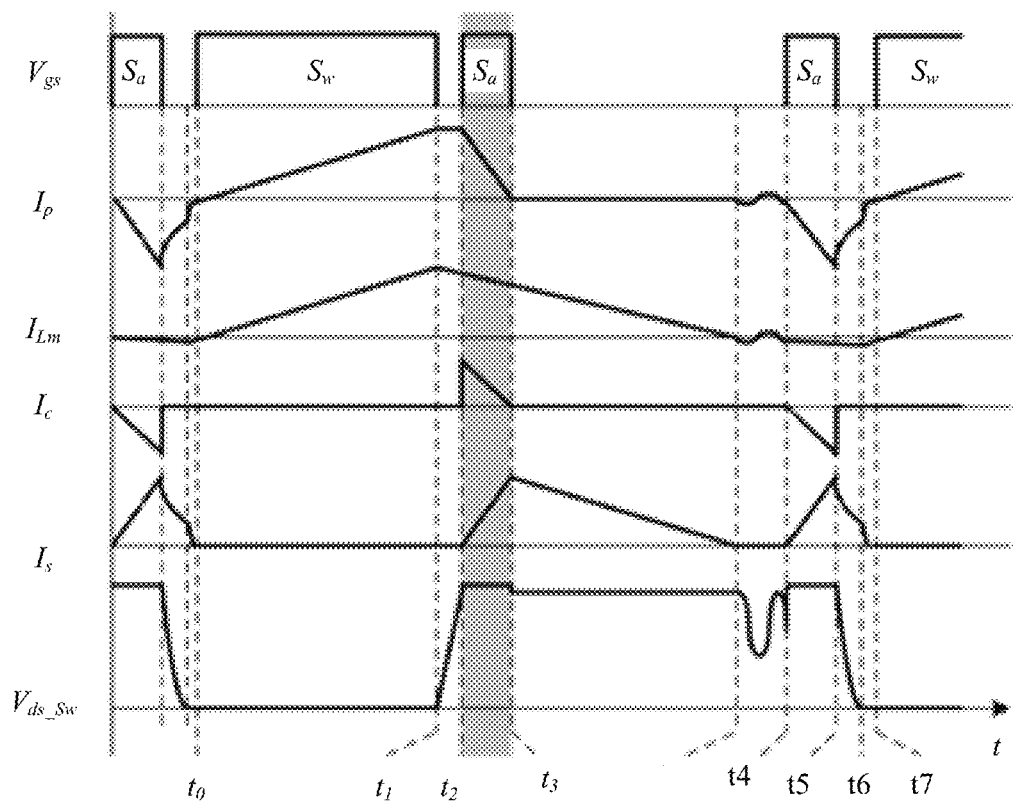
FIG. 6 is a schematic diagram of a change in a voltage and a current in an ACF circuit according to an embodiment of this application.

Based on the control signal shown in FIG. 5, a change in a voltage and a current in the ACF circuit shown in FIG. 3 and FIG. 4 may be shown in FIG. 6. Herein, $I_p$ is a current in the leakage inductor Lk, $I_{Lm}$ is a current in the excitation inductor Lm, $I_c$ is a current in the clamping capacitor Ca, $I_s$ is a current in the secondary side of the transformer, and $V_{ds\_Sw}$ is the voltage difference between the second electrode and the first electrode of the main switching transistor Mw.

As shown in FIG. 5, control signals Sw and Sa may be signals that have a specific periodic rule. In other words, the controller 102 may control the ACF circuit 101 to work periodically. For example, one period corresponds to one time of voltage conversion. In this embodiment of this application, a time point t0 at which the primary side charging of the transformer L is started is used as an initial time point of a period, to simplify description. Corresponding to FIG. 5, currents and voltages in FIG. 6 each also have a specific periodic rule. Herein, t7 may be used as an initial time point t0 of a next period. For ease of description, one period is used as an example for description unless otherwise described in this embodiment of this application.

As shown in FIG. 5 and FIG. 6, the ACF converter may mainly have the following working phases in one period:

At the time point t0, the controller 102 provides a high-level signal to the main switching transistor Mw, to conduct the main switching transistor Mw.

After the main switching transistor Mw is conducted, the primary side of the transformer L and the main switching transistor Mw form a path, so that the transformer L starts the primary side charging. In other words, the leakage inductor Lk and the excitation inductor Lm start to be charged. As shown in FIG. 6, after the time point t0, both the current $I_p$ in the leakage inductor Lk and the current $I_{Lm}$ in the excitation inductor Lm increase as the main switching transistor Mw is conducted.

In this case, dotted terminals that are of the primary side and the secondary side of the transformer L and that are shown by black dots in FIG. 3 have negative potentials, and potentials at both ends of the secondary side of the transformer L are opposite to a conduction direction of the rectifier diode 1013. Therefore, the rectifier diode 1013 can be cut off. A circuit in which the secondary side of the transformer L is located cannot form a loop, so that the first output terminal 105 connected to the negative electrode of the load circuit 300 and the second output terminal 106 connected to the positive electrode of the load circuit 300 do not output a reverse current to the load circuit 300, and discharging power from the primary side of the transformer L to the secondary side can also be suppressed.

At a time point t1, the controller 102 provides a low-level signal to the main switching transistor Mw, to cut off the main switching transistor Mw.

As shown in FIG. 6, due to existence of the parasitic capacitor in the main switching transistor Mw, the voltage difference between the first electrode and the second electrode of the main switching transistor M2 gradually increases as the main switching transistor Mw is turned off, and tends to stabilize after the main switching transistor Mw is completely turned off.

After the time point t1, the path including the primary side of the transformer L and the main switching transistor Mw is cut off. In this case, the dotted terminals that are of the primary side and the secondary side and that are shown by the black dots become positive potentials. The potentials at both ends of the secondary side of the transformer L are the same as a conduction direction of the rectifier diode 1013, and therefore, the rectifier diode 1013 can be conducted. The primary side of the transformer L discharges power to the secondary side, and all power in the excitation inductor Lm in FIG. 4 is transferred to the secondary side of the transformer, thereby converting the input voltage Vi into the output voltage Vo. The secondary side of the transformer L may further store the output voltage Vo in the output capacitor Co, or output the output voltage Vo to the load circuit 300. As shown in FIG. 6, after the time point t1, the excitation inductor Lm discharges power to the primary side, and the current $I_{Lm}$ in the excitation inductor Lm gradually decreases.

At a time point t2, the controller 102 provides a high-level signal to the clamping transistor Ma, to conduct the clamping transistor Ma.

The leakage inductance power in the leakage inductor Lk is transferred to the clamping capacitor Ca and stored in the clamping capacitor Ca. As shown in FIG. 6, at the time point t2, as the clamping transistor Ma is conducted, the clamping transistor Ma, the clamping capacitor Ca, and the primary side of the transformer L form a path, and the leakage inductor Lk starts to release the stored leakage inductance power. Therefore, the current $I_p$ in the leakage inductor Lk gradually decreases.

At the time point t2, the clamping transistor Ma is conducted, so that a loss generated when the leakage inductance power in the leakage inductor Lk is transferred to the clamping capacitor Ca can be reduced, thereby helping reduce an overall loss caused by the ACF converter. In addition, because the leakage inductance power in the leakage inductor Lk is released to the clamping capacitor Ca, parasitic oscillation caused by the leakage inductor Lk can be suppressed, to help improve an anti-electromagnetic interference (electromagnetic interference, EMI) characteristic of the ACF circuit.

In a possible implementation, after duration for which the transformer module 1011 stops the primary side charging and starts the secondary side discharging reaches fourth duration, the controller 102 controls the clamping module 1012 to start receiving the leakage inductance power from the transformer module. The fourth duration is not less than a switching delay of the main switching transistor Mw. Specifically, it is assumed that a time interval between the time point t1 and the time point t2 is T4, the switching delay of the main switching transistor Mw is Td, and T4≥Td, to prevent the main switching transistor Mw and the clamping transistor Ma from being simultaneously conducted due to the switching delay. The switching delay Td of the main switching transistor Mw may be obtained in a plurality of manners, for example, may be obtained based on a physical parameter of the main switching transistor Mw or may be obtained through sampling detection. This is not limited in this embodiment of this application.

At a time point t3, the controller 102 provides a low-level signal to the clamping transistor Ma, to cut off the clamping transistor Ma.

In this embodiment of this application, after duration for which the clamping module 1012 starts receiving the leakage inductance power from the transformer module 1011 reaches fifth duration, the controller 102 may control the clamping module 1012 to stop receiving the leakage inductance power from the transformer module 1011. Specifically, assuming that a time interval between the time point t3 and the time point t2 is T5, duration of T5 may be determined based on a clamping current that flows through the clamping module 1012, namely, the current $I_p$ in FIG. 6. In a possible implementation, after enabling the clamping module 1012 at the time point t2, the controller 102 may monitor a value of the current $I_p$ in the leakage inductor Lk. When $I_p$ is 0 (or less than a preset threshold), it may be considered that all leakage inductance power in the leakage inductor Lk has been released. Therefore, it may be determined that a current time point is the time point t3 (equivalent to a case in which the duration of T5 is determined). In the ACF circuit shown in FIG. 3, the current $I_p$ is a current flowing between the primary side of the transformer L and the clamping transistor Ma, and the controller 102 may set a current detection contact between the primary side of the transformer L and the clamping transistor Ma, to monitor the value of the current $I_p$.

In another possible implementation, the duration of T5 is preset in the controller 102, and the duration of T5 may be required duration in which the current $I_p$ that is estimated by using a parameter of the transformer L or a plurality of tests decreases to 0 (or a value less than a preset threshold) after the time point t2. After determining the time point t2, the controller 102 may further determine the time point t3 based on the preset duration of T5.

At a time point t4, the controller 102 provides a high-level signal to the clamping transistor Ma, to conduct the clamping transistor Ma.

As shown in FIG. 6, discharging of the excitation inductor Lm is completed before the time point t4, and the current $I_{Lm}$ approaches to 0. Therefore, after the clamping transistor Ma is conducted at the time point t4, an end that is of the clamping capacitor Ca and that is connected to the primary side of the transformer L has a high potential relative to the primary side of the transformer L, and the clamping capacitor Ca, the primary side of the transformer L, and the clamping transistor Ma form a loop, so that that the clamping capacitor Ca can reversely charge the primary side of the transformer L. Referring to FIG. 6, the reverse charging reversely increases the current $I_p$ in the leakage inductor Lk and the current $I_{Lm}$ in the excitation inductor Lm. Correspondingly, in the ACF circuit shown in FIG. 3, a dotted terminal shown by the black dot on the primary side has a positive potential, and the other end of the primary side has a negative potential.

At a time point t5, the controller 102 provides a low-level signal to the clamping transistor Ma, to cut off the clamping transistor Ma.

After the clamping transistor Ma stops reversely charging the primary side of the transformer L, the primary side of the transformer L starts to discharge power, the dotted terminal shown by the black dot on the primary side becomes a negative potential, and the other end of the primary side becomes a positive potential. In this case, both ends of the primary side of the transformer L, the first electrode and the second electrode of the main switching transistor Mw, the first input terminal 103, and the second input terminal 104 have a same potential direction, thereby forming a loop. The charge stored in the parasitic capacitor of the main switching transistor Mw is released, so that the main switching transistor Mw gradually restores the soft switching state.

Figure 7:
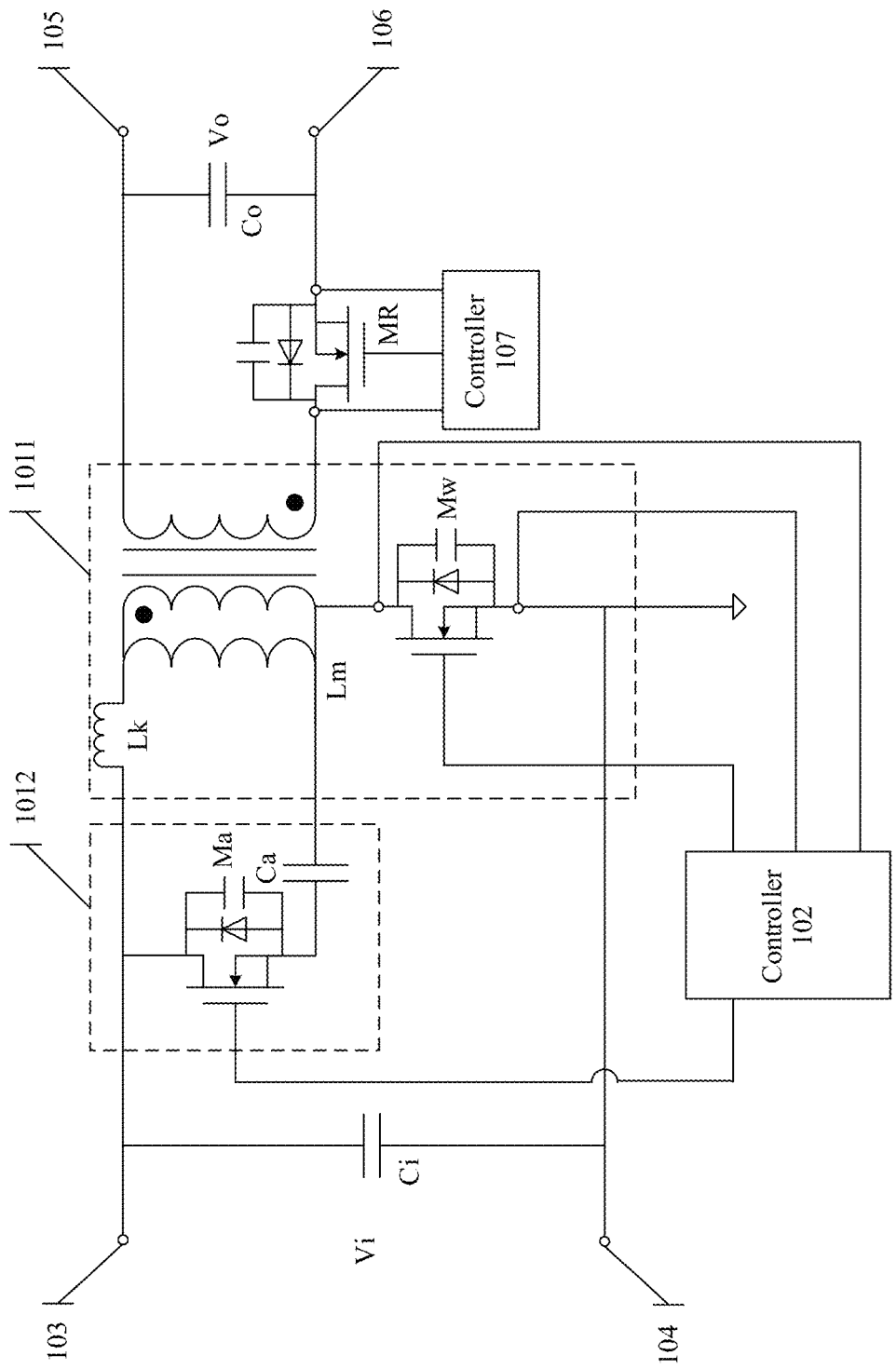
FIG. 7 is a schematic structural diagram of an ACF converter according to an embodiment of this application.

In this embodiment of this application, to further improve an adaptive capability of the ACF converter, namely, to automatically adjust time points t0 to t5 of each period, this embodiment of this application further provides another ACF converter, as shown in FIG. 7.

In FIG. 7, the controller 102 is further connected to the first electrode and the second electrode of the main switching transistor Mw. After the time point t5, the controller 102 may obtain a voltage of the first electrode and a voltage of the second electrode of the main switching transistor Mw. The time points t0 to t5 in FIG. 6 are updated based on the voltage difference between the voltage of the first electrode and the voltage of the second electrode. The updated time points t0 to t5 may be used as time points in the next period.

In this embodiment of this application, the controller 102 may further preset a time point t6 after the time point t5. As shown in FIG. 6, the time point t6 may be a time point at which a current period ends and that is estimated by the controller 102 based on preset duration of each period. For example, assuming that the preset duration of each period is T0, it may be determined, based on the time point t0, that the time point t6 is a time point that is spaced by duration of T0 from the time point t0.

As described above, after the clamping module is controlled to stop releasing the leakage inductance power, the charge stored in the parasitic capacitor of the main switching transistor Mw is released, so that the main switching transistor Mw gradually restores the soft switching state. In a possible implementation, if the voltage difference is reduced to a value less than a first preset threshold within third duration after the clamping module 1012 is controlled to stop releasing the leakage inductance power, the second duration is shortened; and/or if the voltage difference is not reduced to the value less than the first preset threshold within the third duration after the clamping module 1012 is controlled to stop releasing the leakage inductance power, the second duration is extended.

The third duration corresponds to a time interval between the time point t5 and the time point t6, and the second duration corresponds to a time interval between the time point t0 and the time point t1. To be specific, if the voltage difference between the voltage of the first electrode and the voltage of the second electrode of the main switching transistor Mw is reduced to the value less than the first preset threshold before the time point t6, the time points t0 to t6 are updated based on a current time point, where a time interval between the updated time point t0 and the updated time point t1 is less than the time interval between the current time point t0 and the current time point t1; and/or if the voltage difference between the voltage of the first electrode and the voltage of the second electrode is not reduced to the value less than the first preset threshold before the time point t6, the time points t0 to t6 are updated based on the time point t6, where a time interval between the updated time point t0 and the updated time point t1 is greater than the time interval between the current time point t0 and the current time point t1.

For example, if the voltage difference between the voltage of the first electrode and the voltage of the second electrode of the main switching transistor Mw is reduced to the value less than the first preset threshold at the time point T1 before the time point t6, the time point T1 or a time point that is preset duration later than the time point T1 may be used as the updated time point t0. If the voltage difference between the voltage of the first electrode and the voltage of the second electrode of the main switching transistor Mw is not reduced to the value less than the first preset threshold before the time point t6, in other words, the voltage difference between the voltage of the first electrode and the voltage of the second electrode of the main switching transistor Mw is still greater than the first preset threshold at the time point t6, the time point t6 or a time point that is preset duration later than the time point t6 may be used as the updated time point t0.

Because the main switching transistor Mw enters the soft switching state before the time point t6, it indicates that the primary side of the transformer L is excessively charged in the current period, resulting in excessive leakage inductance power in the leakage inductor Lk. Further, the clamping capacitor Ca reversely excessively charges the transformer L, so that the main switching transistor Mw quickly enters the soft switching state. Therefore, time to charge the primary side of the transformer L needs to be shortened in a next period; otherwise, the time to charge the primary side of the transformer L needs to be shortened in the next period.

Usually, there is a switching delay in a process of turning on and off the transistor, so that after the controller 102 provides the high-level signal to the control electrode of the main switching transistor Mw (the main switching transistor Mw is an NMOS transistor), the main switching transistor Mw is conducted only after a switching delay. During the switching delay, the voltage difference between the voltage of the first electrode and the voltage of the second electrode of the main switching transistor Mw may be further reduced. Based on this, in a possible implementation of this embodiment of this application, the controller 102 may further obtain the voltage of the first electrode and the voltage of the second electrode of the main switching transistor Mw after the time point t0, and if the voltage difference is reduced to a value less than the second preset threshold, the first duration is shortened; and/or if the voltage difference is greater than the second preset threshold, the first duration is extended.

The first duration corresponds to a time interval between the time point t4 and the time point t5. To be specific, if the voltage difference between the voltage of the first electrode and the voltage of the second electrode of the main switching transistor Mw is less than the second preset threshold, after updating of the time points t0 to t5 (and t6) are completed, a time interval between an updated time point t4 and an updated time point t5 is less than a time interval between a current time point t4 and a current time point t5, in other words, the time interval between the time point t4 and the time point t5 in the next period is shortened; and/or if the voltage difference between the voltage of the first electrode and the voltage of the second electrode of the main switching transistor Mw is greater than the second preset threshold, the time interval between the updated time point t4 and the updated time point t5 is greater than the time interval between the current time point t4 and the current time point t5, in other words, the time interval between the time point t4 and the time point t5 in the next period is extended.

Usually, a value of the second preset threshold is not greater than a value of the first preset threshold. If the voltage difference between the voltage of the first electrode and the voltage of the second electrode of the main switching transistor Mw is less than the second preset threshold, it indicates that the main switching transistor Mw is excessively soft-switched, and excessive soft switching causes an increase in a loss caused by the ACF converter and a decrease in efficiency. Based on this, in this embodiment of this application, duration for which the primary side of the transformer L is reversely charged in a next period is shortened, to perform adjustment. In other words, the time interval between the time point t4 and the time point t5 is shortened. If the voltage difference between the voltage of the first electrode and the voltage of the second electrode of the main switching transistor Mw is greater than the second preset threshold, it indicates that the main switching transistor Mw may be further soft-switched, to further reduce a switching loss. Therefore, the duration for which the primary side of the transformer L is reversely charged in the next period can be extended, to perform adjustment. In other words, the time interval between the time point t4 and the time point t5 is extended.

Usually, different main switching transistors Mw have different parasitic capacitors, so that different quantities of charges remain between the first electrode and the second electrode when the different main switching transistors Mw are cut off. In addition, even for a same main switching transistor Mw, when the load size of the load circuit 300 changes, a quantity of charges remaining between the first electrode and the second electrode when the main switching transistor Mw is cut off changes. In this embodiment of this application, the controller 102 adjusts the time interval between the time point t4 and the time point t5 based on the first electrode and the second electrode of the main switching transistor Mw, to adapt to different main switching transistors Mw and a change in the load size of the load circuit 300, so that the main switching transistor Mw can enter a relatively good soft switching state before the main switching transistor Mw is enabled each time.

The ACF converter usually further includes the rectification module 1013 connected to the secondary side of the transformer L, to suppress discharging power to the secondary side in a charging process of the primary side of the transformer L, and avoid providing a reverse output voltage to the load circuit 300. As shown in FIG. 7, the rectification module 1013 in the ACF converter provided in this embodiment of this application may further be a secondary side transistor MR. Because a reference potential corresponding to a voltage 0 on the secondary side of the transformer L may be different from a reference potential corresponding to the voltage 0 on the primary side, the ACF converter may further include a controller 107, to control the rectifier transistor MR.

Specifically, as shown in FIG. 7, a first electrode of the secondary side transistor MR is connected to the secondary side of the transformer L, a second electrode is connected to the second output terminal 106, and the control electrode is connected to the controller 107. The controller 107 is connected to the first electrode and the second electrode of the secondary side transistor MR, and is configured to: obtain a voltage of the first electrode and a voltage of the second electrode of the secondary side transistor MR, and when the voltage of the first electrode and the voltage of the second electrode meet a preset forward relationship, send a secondary side transistor enabling signal to a control electrode of the secondary side transistor MR. The secondary side transistor MR enabling signal is used to conduct the first electrode and the second electrode of the secondary side transistor.

The forward relationship is a relative value relationship between a voltage value of the first electrode and a voltage value of the second electrode when the transformer module 101 starts the secondary side discharging and power released by the transformer module 101 flows between the first electrode and the second electrode of the rectifier transistor MR.

For example, as shown in FIG. 7, the second electrode of the secondary side transistor MR is connected to the second output terminal 106. The second output terminal 106 is configured to connect to the positive electrode of the load circuit 300. Therefore, when the power released by the transformer module 101 flows between the first electrode and the second electrode of the rectifier transistor MR, the relative value relationship between the voltage value of the first electrode and the voltage value of the second electrode needs to be that when the voltage value of the first electrode is greater than the voltage value of the second electrode, in other words, when it is determined that the voltage value of the first electrode is greater than the voltage value of the second electrode, the controller 107 sends the secondary side transistor enabling signal to the secondary side transistor MR, to enable the secondary side transistor MR.

In another implementation, the second electrode of the secondary side transistor MR may also be connected to the first output terminal 105. The first output terminal 105 is configured to connect to the negative electrode of the load circuit 300. Therefore, when the power released by the transformer module 101 flows between the first electrode and the second electrode of the rectifier transistor MR, the relative value relationship between the voltage value of the first electrode and the voltage value of the second electrode needs to be that when the voltage value of the first electrode is less than the voltage value of the second electrode, in other words, when it is determined that the voltage value of the first electrode is less than the voltage value of the second electrode, the controller 107 sends the secondary side transistor enabling signal to the secondary side transistor MR, to enable the secondary side transistor MR.

Based on a same technical concept, an embodiment of this application further provides a voltage conversion method performed by an ACF converter. The method may be performed by the controller 102 in the ACF converter provided in any one of the foregoing embodiments.

Figure 8:
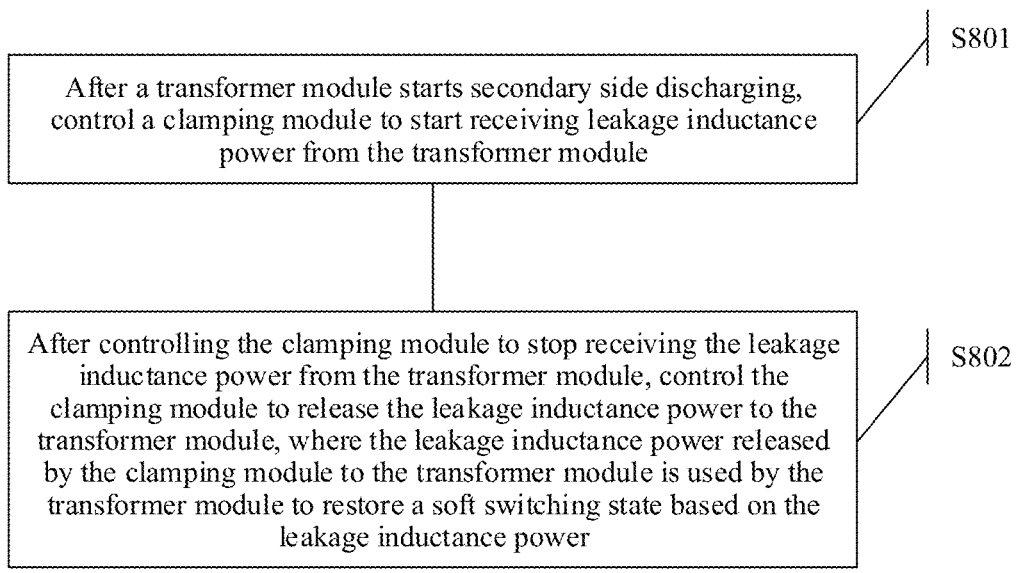
FIG. 8 is a schematic flowchart of a voltage conversion method according to an embodiment of this application.

FIG. 8 is a schematic flowchart of a voltage conversion method according to an embodiment of this application. As shown in FIG. 8, the voltage conversion method mainly includes the following steps.

S801: After a transformer module starts secondary side discharging, control a clamping module to start receiving leakage inductance power from the transformer module.

S802: After controlling the clamping module to stop receiving the leakage inductance power from the transformer module, control the clamping module to release the leakage inductance power to the transformer module, where the leakage inductance power released by the clamping module to the transformer module is used by the transformer module to restore a soft switching state based on the leakage inductance power.

For a specific implementation of the method steps shown in FIG. 8, refer to the foregoing descriptions of the ACF converter in the embodiments of this application. Details are not described again in this embodiment of this application.

In this embodiment of this application, a controller 102 may run software, perform a logic circuit operation, or the like, to implement the voltage conversion method performed by the ACF converter. It should be understood that based on a case in which the voltage conversion method performed by the ACF converter provided in the embodiments of this application is learned of, a person skilled in the art can easily think of an implementation by running software or performing a logic circuit operation. This is not limited in this embodiment of this application.

Based on a same technical concept, an embodiment of this application further provides an electronic device. The electronic device includes a power supply circuit, a load circuit, and the ACF converter that is separately connected to the power supply circuit and the load circuit and that is provided in any one of the foregoing. A connection relationship may be shown in FIG. 1.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. An Active Clamp Flyback (ACF) converter, wherein the ACF converter comprises a transformer circuit, a clamping circuit, and a first controller, wherein:
the first controller is configured to:
after the transformer circuit starts secondary side discharging, control the clamping circuit to start receiving leakage inductance power from the transformer circuit; and
after controlling the clamping circuit to stop receiving the leakage inductance power from the transformer circuit, control the clamping circuit to release the leakage inductance power to the transformer circuit, wherein the leakage inductance power released by the clamping circuit to the transformer circuit is used by the transformer circuit to restore a soft switching state based on the leakage inductance power;
the ACF converter further comprises a first power supply terminal and a second power supply terminal, wherein the first power supply terminal and the second power supply terminal are configured to connect to an electrode of a power supply circuit, the transformer circuit comprises a main switching transistor and a transformer, a first electrode of the main switching transistor is connected to the first power supply terminal, a second electrode is connected to one end of a primary side of the transformer, a gate electrode is connected to the first controller, and the other end of the primary side of the transformer is connected to the second power supply terminal;
when controlling the clamping module to release the leakage inductance power to the transformer module, the first controller is specifically configured to:
after a duration for which the clamping circuit is controlled to release the leakage inductance power to the transformer circuit reaches a first duration, control the clamping circuit to stop releasing the leakage inductance power; and
wherein the first controller is further configured to:
obtain a voltage difference between a voltage of the first electrode and a voltage of the second electrode, and adjust the first duration based on the voltage difference.

2. The ACF converter according to claim 1, wherein when adjusting the first duration based on the voltage difference, the first controller is specifically configured to:
shorten the first duration if the voltage difference is less than a second preset threshold; and/or
extend the first duration if the voltage difference is greater than the second preset threshold.

3. The ACF converter according to claim 1, wherein before the transformer circuit starts the secondary side discharging, the first controller is further configured to:
control the transformer circuit to start primary side charging, and after duration of the primary side charging reaches second duration, control the transformer circuit to stop the primary side charging and to start the secondary side discharging; and
wherein the first controller is further configured to:
adjust the second duration based on the voltage difference.

4. The ACF converter according to claim 3, wherein when adjusting the second duration based on the voltage difference, the first controller is specifically configured to:
shorten the second duration if the voltage difference is reduced to a value less than a first preset threshold within a third duration after the clamping circuit is controlled to stop releasing the leakage inductance power; and/or
extend the second duration if the voltage difference is not reduced to the value less than the first preset threshold within the third duration after the clamping circuit is controlled to stop releasing the leakage inductance power.

5. The ACF converter according to claim 3, wherein when controlling the clamping circuit to start receiving the leakage inductance power from the transformer circuit, the first controller is specifically configured to:
after a duration for which the transformer circuit stops the primary side charging and starts the secondary side discharging reaches a fourth duration, control the clamping circuit to start receiving the leakage inductance power from the transformer circuit, wherein the fourth duration is not less than a switching delay of the main switching transistor.

6. The ACF converter according to claim 1, wherein after controlling the clamping circuit to start receiving the leakage inductance power from the transformer module, the first controller is further configured to:
after a duration for which the clamping circuit starts receiving the leakage inductance power from the transformer circuit reaches a fifth duration, control the clamping circuit to stop receiving the leakage inductance power from the transformer circuit, wherein the fifth duration is determined based on a clamping current flowing through the clamping circuit.

7. The ACF converter according to claim 1, wherein the ACF converter further comprises a rectification circuit, one end of the rectification circuit is connected to the second electrode of the main switching transistor, and the other end is connected to a load circuit; and
wherein the rectification circuit is configured to control a direction of an output current of the transformer circuit.

8. The ACF converter according to claim 7, wherein the ACF converter further comprises a second controller, and the rectification circuit comprises a secondary side transistor;
wherein a first electrode of the secondary side transistor is connected to a secondary side of the transformer, a second electrode is connected to the first output terminal or a second output terminal, and a control electrode is connected to the second controller; and
wherein the second controller is separately connected to the first electrode and the second electrode of the secondary side transistor, and is configured to:
obtain a voltage of the first electrode and a voltage of the second electrode of the secondary side transistor, and conduct the first electrode and the second electrode of the secondary side transistor when the voltage of the first electrode and the voltage of the second electrode meet a preset forward relationship, wherein the forward relationship is a relative value relationship between a voltage value of the first electrode and a voltage value of the second electrode when the transformer circuit starts the secondary side discharging and power released by the transformer circuit flows between the first electrode and the second electrode.

9. A voltage conversion method performed by an Active Clamp Flyback (ACF) converter, wherein the ACF converter comprises a transformer circuit, a clamping circuit, and a first controller, and the method is applied to the first controller and comprises:

after the transformer circuit starts secondary side discharging, controlling the clamping circuit to start receiving leakage inductance power from the transformer circuit; and after controlling the clamping circuit to stop receiving the leakage inductance power from the transformer circuit, controlling the clamping circuit to release the leakage inductance power to the transformer circuit, wherein the leakage inductance power released by the clamping module to the transformer circuit is used by the transformer circuit to restore a soft switching state based on the leakage inductance power;

wherein the ACF converter further comprises a first power supply terminal and a second power supply terminal, the first power supply terminal and the second power supply terminal are configured to connect to an electrode of a power supply circuit, the transformer circuit comprises a main switching transistor and a transformer, a first electrode of the main switching transistor is connected to the first power supply terminal, a second electrode is connected to one end of a primary side of the transformer, a gate electrode is connected to the first controller, and the other end of the primary side of the transformer is connected to the second power supply terminal;

wherein the controlling the clamping circuit to release the leakage inductance power to the transformer circuit comprises:

after a duration for which the clamping circuit is controlled to release the leakage inductance power to the transformer circuit reaches a first duration, controlling the clamping circuit to stop releasing the leakage inductance power; and wherein the method further comprises:

obtaining a voltage difference between a voltage of the first electrode and a voltage of the second electrode, and adjusting the first duration based on the voltage difference.

10. The method according to claim 9, wherein the adjusting the first duration based on the voltage difference comprises:

shortening the first duration if the voltage difference is less than a second preset threshold; and/or extending the first duration if the voltage difference is greater than the second preset threshold.

11. The method according to claim 9, wherein before the transformer circuit starts the secondary side discharging, the method further comprises:

controlling the transformer circuit to start primary side charging, and after a duration of the primary side charging reaches a second duration, controlling the transformer circuit to stop the primary side charging and to start the secondary side discharging; and wherein the method further comprises:

adjusting the second duration based on the voltage difference.

12. The method according to claim 11, wherein the adjusting the second duration based on the voltage difference comprises:

shortening the second duration if the voltage difference is reduced to a value less than a first preset threshold within a third duration after the clamping circuit is controlled to stop releasing the leakage inductance power; and/or extending the second duration if the voltage difference is not reduced to the value less than the first preset threshold within the third duration after the clamping circuit is controlled to stop releasing the leakage inductance power.

13. The method according to claim 11, wherein the controlling the clamping circuit to start receiving leakage inductance power from the transformer circuit comprises:

after a duration for which the transformer circuit stops the primary side charging and starts the secondary side discharging reaches a fourth duration, controlling the clamping module to start receiving the leakage inductance power from the transformer circuit, wherein the fourth duration is not less than a switching delay of the main switching transistor.

14. The method according to claim 9, wherein after the controlling the clamping circuit to start receiving leakage inductance power from the transformer circuit, the method further comprises:

after duration for which the clamping circuit starts receiving the leakage inductance power from the transformer circuit reaches a fifth duration, controlling the clamping circuit to stop receiving the leakage inductance power from the transformer circuit, wherein the fifth duration is determined based on a clamping current flowing through the clamping circuit.

15. The method according to claim 9, wherein the ACF converter further comprises a rectification circuit, one end of the rectification circuit is connected to the second electrode of the main switching transistor, and the other end is connected to a load circuit; and wherein the rectification circuit is configured to control a direction of an output current of the transformer circuit.

16. An electronic device, comprising a power supply circuit, a load circuit, and an Active Clamp Flyback (ACF) converter that is separately connected to the power supply circuit and the load circuit, wherein the ACF converter comprises a transformer circuit, a clamping circuit, and a first controller, wherein:

the first controller is configured to:

after the transformer circuit starts secondary side discharging, control the clamping circuit to start receiving leakage inductance power from the transformer circuit; and after controlling the clamping circuit to stop receiving the leakage inductance power from the transformer circuit, control the clamping circuit to release the leakage inductance power to the transformer circuit, wherein the leakage inductance power released by the clamping circuit to the transformer circuit is used by the transformer circuit to restore a soft switching state based on the leakage inductance power;

the ACF converter further comprises a first power supply terminal and a second power supply terminal, wherein the first power supply terminal and the second power supply terminal are configured to connect to an electrode of a power supply circuit, the transformer circuit comprises a main switching transistor and a transformer, a first electrode of the main switching transistor is connected to the first power supply terminal, a second electrode is connected to one end of a primary side of the transformer, a gate electrode is connected to the first controller, and the other end of the primary side of the transformer is connected to the second power supply terminal;

when controlling the clamping module to release the leakage inductance power to the transformer module, the first controller is specifically configured to:

after a duration for which the clamping circuit is controlled to release the leakage inductance power to the transformer circuit reaches a first duration, control the clamping circuit to stop releasing the leakage inductance power; and the first controller is further configured to:

obtain a voltage difference between a voltage of the first electrode and a voltage of the second electrode, and adjust the first duration based on the voltage difference.

17. The electronic device according to claim 16, wherein when adjusting the first duration based on the voltage difference, the first controller is specifically configured to:

shorten the first duration if the voltage difference is less than a second preset threshold; and/or extend the first duration if the voltage difference is greater than the second preset threshold.

* * * * *